(12) United States Patent
Li et al.

(10) Patent No.: US 11,605,226 B2
(45) Date of Patent: Mar. 14, 2023

(54) VIDEO DATA PROCESSING METHOD AND APPARATUS, AND READABLE STORAGE MEDIUM

(71) Applicant: BAIDU ONLINE NETWORK TECHNOLOGY (BEIJING) CO., LTD., Beijing (CN)

(72) Inventors: Yingchao Li, Beijing (CN); Chen Zhao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 746 days.

(21) Appl. No.: 16/666,475

(22) Filed: Oct. 29, 2019

(65) Prior Publication Data

US 2020/0134456 A1 Apr. 30, 2020

(30) Foreign Application Priority Data

Oct. 29, 2018 (CN) .......................... 201811270947.9

(51) Int. Cl.
*G06V 20/40* (2022.01)
*G06F 16/683* (2019.01)
(Continued)

(52) U.S. Cl.
CPC ............ *G06V 20/46* (2022.01); *G06F 16/683* (2019.01); *G06N 3/04* (2013.01); *G06N 3/08* (2013.01);
(Continued)

(58) Field of Classification Search
None
See application file for complete search history.

(56) References Cited

U.S. PATENT DOCUMENTS

2014/0212106 A1 7/2014 Izo et al.
2021/0004402 A1* 1/2021 Li .......................... G06F 17/00

FOREIGN PATENT DOCUMENTS

CN 105338404 A 2/2016
CN 105550217 A 5/2016
(Continued)

OTHER PUBLICATIONS

Decision to Decline Amendment in KR Patent Application No. 10-2019-0117712 dated Oct. 19. 2021.
(Continued)

*Primary Examiner* — Leon Flores
(74) *Attorney, Agent, or Firm* — Dilworth IP, LLC

(57) ABSTRACT

The present disclosure provides a video data processing method and device, and a readable storage medium, where the technical means is adopted which includes: processing, according to a preset trained deep learning algorithm model, input video data to be processed, to obtain a label vector of the video data; determining, according to a label vector of each music data in a music library and a preset recommendation algorithm, a recommendation score of the label vector of each music data with respect to the label vector of the video data; and taking, according to the each recommendation score, the music data matching the video data as background music. By means of the above, and further a deep learning algorithm model and a recommendation algorithm, the data processing efficiency of finding the background music of the video data in the music library is effectively improved, and the labor cost is reduced.

18 Claims, 4 Drawing Sheets

(51) Int. Cl.
  *G06N 3/04* (2023.01)
  *G06N 3/08* (2023.01)
  *G06V 10/82* (2022.01)

(52) U.S. Cl.
  CPC .............. *G06V 10/82* (2022.01); *G06V 20/41* (2022.01); *G06V 20/48* (2022.01)

(56) References Cited

FOREIGN PATENT DOCUMENTS

| CN | 106529996 A | 3/2017 |
| CN | 106534888 A | 3/2017 |
| CN | 108184153 A | 6/2018 |
| CN | 108259949 A | 7/2018 |
| CN | 108540833 A | 9/2018 |
| JP | 2001184357 A | 7/2001 |
| JP | 2017111760 A | 6/2017 |
| KR | 20070110622 A | 11/2007 |
| WO | 2018145015 A1 | 8/2018 |

OTHER PUBLICATIONS

Lee, Jie Hwan, Music genre classification using Deep learning, Korea Information Science Society, 2017, pp. 2007-2009 (with English language abstract on p. 2).
Notice of Allowance in JP Patent Application No. 2019167405 dated Feb. 2, 2021.
First Office Action in KR Patent Application No. 20190117712 dated Feb. 16, 2021.
First Office Action of JP Patent Application No. 2019167405 dated Sep. 15, 2020.
Second Office Action in CN Patent Application No. 201811270947.9 dated Apr. 15, 2021.
First Office Action issued in CN Patent Application No. 201811270947.9 dated Aug. 31, 2020.

\* cited by examiner

VIDEO DATA PROCESSING METHOD AND APPARATUS, AND READABLE STORAGE MEDIUM

CROSS-REFERENCE TO RELATED APPLICATION

This application claims priority to Chinese Patent Application No. 201811270947.9, filed on Oct. 29, 2018, which is hereby incorporated by reference in its entirety.

TECHNICAL FIELD

The disclosure relates to the field of computer technology, and in particular, to a video data processing method, a video data processing apparatus and a readable storage medium.

BACKGROUND

Matching background music based on a video refers to the process of selecting and determining background music that matches video data according to the content, style, rhythm, and other features of the video data after the video is captured or edited.

In the prior art, the above process is implemented manually, that is, the background music producer of the video data needs to interpret the content, style, rhythm and other attributes of the video data, and search for appropriate background music in a preset music library according to experience.

However, the time required to manually find the appropriate background music in a music library with large data volume is long while the requirements for the producer's accumulated experience and ability to interpret the video data are high, which decreases the data processing efficiency of finding the background music matching the video data low and increases the labor cost.

SUMMARY

For the above problem in the existing data processing method, which has been mentioned above, of the low efficiency and high labor cost in finding background music matching video data, the present disclosure provides a video data processing method and apparatus, and a readable storage medium.

In a first aspect, the present application provides a video data processing method, including:

processing, according to a preset trained deep learning algorithm model, input video data to be processed to obtain a label vector of the video data, where the label vector includes a confidence score of the video data under each label;

determining, according to a label vector of each music data in a music library and a preset recommendation algorithm, a recommendation score of the label vector of the each music data with respect to the label vector of the video data; and outputting, according to each recommendation score, music data matching the video data.

In an optional implementation, the trained deep learning algorithm model includes at least: a convolutional neural network and a multi-layer perceptron;

and the processing, according to a preset trained deep learning algorithm model, input video data to be processed to obtain a label vector of the video data includes:

inputting the video data to be processed into the convolutional neural network to extract and obtain feature information of the video data; and inputting the feature information of the video data into the multi-layer perceptron to enable the multi-layer perceptron to perform vector-dimensional mapping on the feature information according to a preset label type to obtain the label vector of the video data.

In an optional implementation, before the processing, according to a preset trained deep learning algorithm model, input video data to be processed, the method further includes:

collecting music data and processing collected music data by using the trained deep learning algorithm model to obtain the label vector of the music data; and storing the music data and corresponding label vector in the music library.

In an optional implementation, the determining, according to a label vector of each music data in a music library and a preset recommendation algorithm, a recommendation score of the label vector of the each music data with respect to the label vector of the video data includes:

obtaining, according to the label vector of the video data and the label vector of the each music data in the music library, a similarity between the label vector of the video data and the label vector of the each music data based on the recommendation algorithm; and determining, according to each similarity, the recommendation score of the each music data with respect to the video data.

In an optional implementation, the outputting, according to each recommendation score, music data matching the video data includes:

sorting the each music data in accordance with the each recommendation score and outputting a preset number of music data whose recommendation score is greater than a preset threshold as the music data matching the video data.

In another aspect, the present disclosure provides a video data processing method, including:

building a deep learning algorithm model to be trained; and training the deep learning algorithm model to be trained according to labeled video data and/or labeled music data to obtain the trained deep learning algorithm model;

where the trained deep learning algorithm model is used for any of the forgoing video data processing methods.

In a further aspect, the present disclosure provides a video data processing apparatus, including:

a first processing module, configured to: process, according to a preset trained deep learning algorithm model, input video data to be processed to obtain a label vector of the video data, where the label vector includes a confidence score of the video data under each label; and determine, according to a label vector of each music data in a music library and a preset recommendation algorithm, a recommendation score of the label vector of the each music data with respect to the label vector of the video data; and an outputting module, configured to output, according to each recommendation score, music data matching the video data.

In a further aspect, the present disclosure provides a video data processing apparatus, including:

a second processing module, configured to build a deep learning algorithm model to be trained; and a third processing module, configured to train the deep learning algorithm model to be trained according to labeled video data and/or labeled music data to obtain the trained deep learning algorithm model; where the trained deep learning algorithm model is used for any of the forgoing video data processing methods.

In yet another aspect, the present disclosure provides a video data processing apparatus, including: a memory, a memory, a processor connected to the memory, and a computer program stored in the memory and executable on the processor, where, the processor, when running the computer program, performs any of the forgoing methods.

In a last aspect, the present disclosure provides a readable storage medium, including a program, which, when executed on a terminal, causes the terminal to perform any of the forgoing methods.

For the video data processing method and device, and the readable storage medium provided by the present disclosure, the technical means is adopted which includes: processing, according to a preset trained deep learning algorithm model, input video data to be processed, so as to obtain a label vector of the video data, where the label vector includes a confidence score of the video data under each label; determining, according to a label vector of each music data in a music library and a preset recommendation algorithm, a recommendation score of the label vector of each music data with respect to the label vector of the video data; and taking, according to the each recommendation score, the music data matching the video data as background music. By means of the above, and further a deep learning algorithm model and a recommendation algorithm, the music data matching the video data can be quickly determined, thus the data processing efficiency of finding the background music of the video data in the music library is effectively improved, and the labor cost is reduced.

BRIEF DESCRIPTION OF THE DRAWINGS

The specific embodiments of the present disclosure have been shown by the above-described drawings, which will be described in more detail later. The drawings and the descriptions are not intended to limit the scope of the conception of the present disclosure in any way, but rather to illustrate the concept of the present disclosure for those skilled in the art by reference to the specific embodiments.

The drawings herein are incorporated into the description and form a part of the description, showing embodiments consistent with the present disclosure and used together with the description to explain the principles of the present disclosure.

DESCRIPTION OF EMBODIMENTS

In order to make the objectives, technical solutions, and advantages of the embodiments of the present disclosure more clearly, the technical solutions in the embodiments of the present disclosure will be clearly and completely described in the following with reference to the accompanying drawings in the embodiments of the present disclosure.

Matching background music based on video refers to the process of selecting and determining the background music that matches video data according to the content, style, rhythm, and other features of the video data after the video is captured or edited.

In the prior art, the above process is implemented manually, that is, the background music producer of the video data needs to interpret the content, style, rhythm and other attributes of the video data, and search for appropriate background music in a preset music library according to experience.

However, the time required to manually find the appropriate background music in a music library with large data volume is long while the requirements for the producer's accumulated experience and ability to interpret the video data are high, which decreases the data processing efficiency of finding the background music matching the video data and increases labor cost.

In view of the above-mentioned technical problems, the present disclosure provides a video data processing method, a video data processing apparatus, and a readable storage medium. It should be noted that the video data processing method, the video data processing apparatus, and the readable storage medium provided by the present application can be widely applied to application scenarios where it is necessary to search for music that matches video data, and these application scenarios include, but are not limited to, music production of movie video or entertainment video, automatic selection or automatic recommendation of video background music in entertainment video website or short video software, etc.

Figure 1:
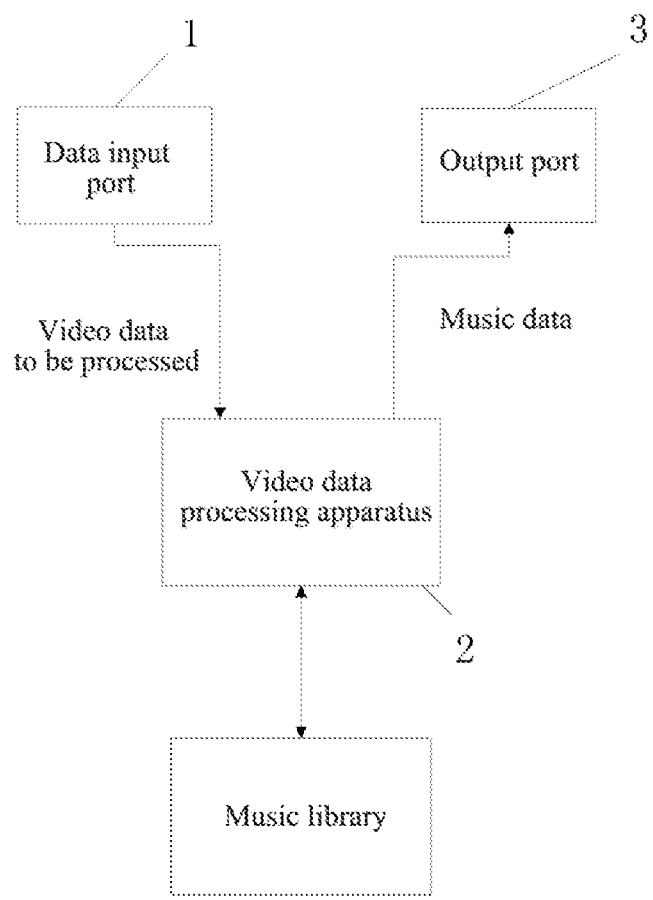
FIG. 1 is a schematic diagram of a network architecture on which the present disclosure is based.

FIG. 1 is a schematic diagram of a network architecture on which the present disclosure is based. As shown in FIG. 1, in the present application, a user may input video data to the video data processing apparatus 2 by using the data input port 1, for the video data processing apparatus 2 to process and then output music data matching the video data to the user through the output port 3, where the video data processing apparatus may be a server or a server cluster that is installed locally or in the cloud, and may also cooperate with a data server 4 on which a music library is based to implement functions such as storing, processing, and reading music data.

In addition, the foregoing data input port 1, the video data processing apparatus 2, and the output port 3 have different forms according to different application scenarios.

For example, in the aforementioned scenario of music production for movie video or entertainment video, the data input port 1 and the output port 3 are present on a video editing interface of the movie video or entertainment video, that is, a user can upload video data to be processed to a local video editing software (i.e., the video data processing apparatus 2) through a data upload trigger component (i.e., data input port 1) provided by an interface of the video editing software, so that the local video editing software processes the video data and displays the processing result on a display component (i.e., data output port 3) provided by the interface of the video editing software.

For another example, in the aforementioned scenario of automatic selection or automatic recommendation of video background music in an entertainment video website or a short video software, the data input port 1 may be specifically combined with the video production port provided by the client of the entertainment video website or the short video software, that is, a user can upload video data to be processed to a server (i.e., the video data processing apparatus 2) on which the entertainment video website or the short video software is based by triggering a video production component (i.e., data input port 1) on the entertainment video website client or the short video software client, and after the video data is processed, the processing result is returned to the entertainment video website client or the short video software client, and displayed on a display component (i.e., the data output port 3) at the specified position of the client.

Each of the above structures should be combined with a specific scenario, and the existing form thereof will also have various possibilities which the present implementation will not limit.

Figure 2:
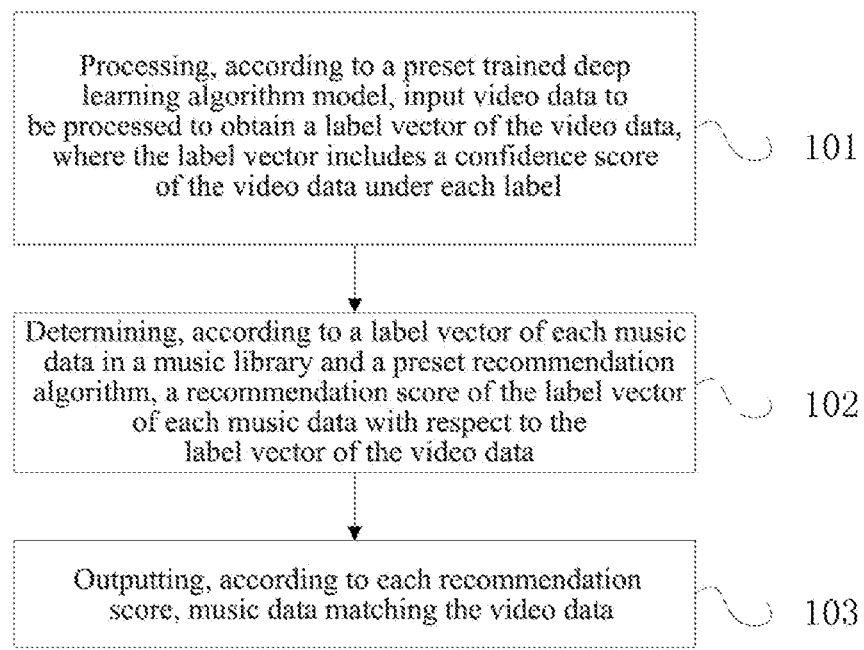
FIG. 2 is a schematic flowchart of a video data processing method according to Embodiment I of the present disclosure.

FIG. 2 is a schematic flowchart of a video data processing method according to Embodiment I of the present disclosure.

As shown in FIG. 2, the video data processing method includes:

step 101, processing, according to a preset trained deep learning algorithm model, input video data to be processed to obtain a label vector of the video data, where the label vector includes a confidence score of the video data under each label;

step 102, determining, according to a label vector of each music data in a music library and a preset recommendation algorithm, a recommendation score of the label vector of each music data with respect to the label vector of the video data;

step 103, outputting, according to each recommendation score, music data matching the video data.

It should be noted that the execution body of the video data processing method provided by the present disclosure may specifically be the video data processing apparatus shown in FIG. 1.

Specifically, the present disclosure provides a video data processing method. First, a video data processing apparatus receives video data to be processed which is uploaded by a user through a data input port, and the video data may be recorded or produced in advance by the user and may also be recorded in real time by the user.

Subsequently, the video data processing apparatus will process the video data to be processed by using a preset trained deep learning algorithm model, and through the trained deep learning algorithm model, the video data processing apparatus will obtain a label vector corresponding to the video data. The label vector is used to represent the label component of the video data, that is, the label vector includes a confidence score of the video data under each label. Specifically, in order to achieve a fast match between video data and music data, a machine learning algorithm such as a trained deep learning algorithm model may be used to perform feature classification analysis on video data. The label can be preset, and should include multiple features in multiple dimensions, such as sadness, joy, and dullness under an emotional dimension; and such as rapidness, slowness, stableness under a rhythm dimension; and such as warmness, ice-coldness, abruptness and black-and-white under a hue dimension; and such as compactness and ease under a plot feature.

The label vector should include a confidence score for each feature of the video data in each dimension. The label vector may be, for example:

[(Emotion) sadness, joy, dullness, volatility, (rhythm) rapidness, slowness, stableness, fluctuation, (hue) warmness, ice-coldness, abruptness, black-and-white, (plot) compactness, ease, turbulence, mess]=[0, 0.25, 0.01, 0.02, 0.25, 0, 0, 0.02, 0.2, 0, 0.01, 0.01, 0.18, 0.01, 0.01, 0.03].

Of course, the present implementation does not limit the type of label in the label vector.

Optionally, the trained deep learning algorithm model in the present implementation includes at least: a convolutional neural network and a multi-layer perceptron; and correspondingly, the process of processing the video data by using the trained deep learning algorithm model may include: inputting the video data to be processed into the convolutional neural network to extract and obtain feature information of the video data, and inputting the feature information of the video data into the multi-layer perceptron to enable the multi-layer perceptron to perform vector-dimensional mapping on the feature information according to a preset label type to obtain the label vector of the video data. It should be noted that both the convolutional neural network and the multi-layer perceptron are relatively mature network architectures, and the present implementation does not limit the same. However, in order to analyze the video data to obtain a corresponding label vector, the present application sequentially performs the foregoing steps by using a convolutional neural network and a multi-layer perceptron, so as to implement the corresponding functions.

Subsequently, the video data processing apparatus determines, according to a label vector of each music data in a music library and a preset recommendation algorithm, a recommendation score of the label vector of each music data with respect to the label vector of the video data.

Specifically, the music library includes each music data which is pre-stored and the label vector of each music data. Further, when the music library is constructed, the following manner may be adopted: collecting music data, processing the collected music data by using the trained deep learning algorithm model to obtain the label vector of the music data; and storing the music data and corresponding label vector in the music library. It should be noted that the trained deep learning algorithm model provided by the present implementation can be used not only for processing video data but also for processing music data, and the processing manner thereof is similar to the foregoing implementation, thus details are not described herein.

Further, in the present implementation, the video data processing apparatus can sequentially obtain, according to the label vector of the video data and the label vector of each music data in the music library, a similarity between the label vector of the video data and the label vector of the each music data based on latent factor algorithm; and determine, according to each similarity, the recommendation score of each music data with respect to the video data. For example, the latent factor algorithm is a recommendation algorithm for calculating the matching degree based on scoring vector, and in the present implementation, the recommendation algorithm including the latent factor algorithm may be used to sequentially calculate the similarity between the label vector of the video data and the label vector of each music data in the music library in order to obtain the recommendation score of each music data, where the recommendation score can be understood as the ratio of an elemental composition of the video data to the same elemental composition of the music data, or the degree of similarity between the element compositions, that is, the higher the recommendation score, the more the music data matches the video data, i.e., it will be more adapted using the music data for the background music of the video data.

Finally, the video data processing apparatus will output, according to the each recommendation score, music data matching the video data. Specifically, the video data processing apparatus may output the music data in various manners, for example, by sorting the each music data in accordance with the each recommendation score and outputting a preset number of music data whose recommendation score is greater than a preset threshold as the music data matching the video data. Of course, it is also possible to output only the music data with the highest recommendation score. The output music data can be used for further screening by the user, and can also be used by backend component to perform further processing such as editing and integration on the music data and the video data.

In the video data processing method provided by the Embodiment I of the present disclosure, the technical means is adopted which includes: processing, according to a preset trained deep learning algorithm model, input video data to be processed, so as to obtain a label vector of the video data, where the label vector includes a confidence score of the video data under each label; determining, according to a label vector of each music data in a music library and a preset recommendation algorithm, a recommendation score of the label vector of each music data with respect to the label vector of the video data; and taking, according to the each recommendation score, the music data matching the video data as background music. By means of the above, and further a deep learning algorithm model and a recommendation algorithm, the music data matching the video data can be quickly determined, thus the data processing efficiency of finding the background music of the video data in the music library is effectively improved, and the labor cost is reduced.

Figure 3:
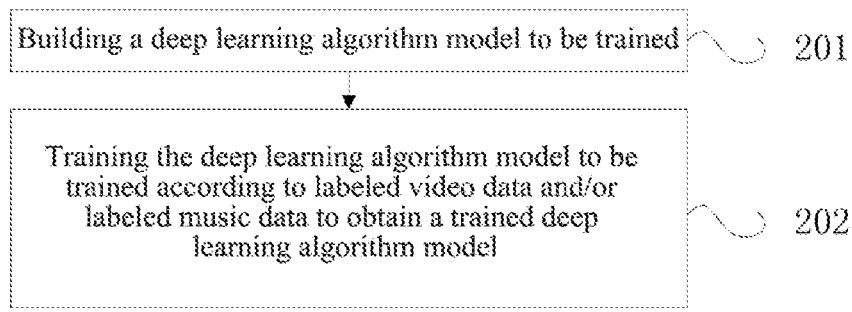
FIG. 3 is a schematic flowchart of a video data processing method according to Embodiment II of the present disclosure.

Based on the foregoing Embodiment I, the Embodiment II provides a video data processing method, and FIG. 3 is a schematic flowchart of a video data processing method according to Embodiment II of the present disclosure.

As shown in FIG. 3, the video data processing method includes:

Step 201, building a deep learning algorithm model to be trained;

Step 202, training the deep learning algorithm model to be trained according to labeled video data and/or labeled music data to obtain a trained deep learning algorithm model.

The trained deep learning algorithm model is used for the video data processing method of the Embodiment I.

Specifically, the execution body of the video data processing method provided by the Embodiment II should be the video data processing apparatus shown in FIG. 1.

In the present implementation, first, a deep learning algorithm model to be trained may be built, where in order to facilitate processing of the video data, the deep learning algorithm model to be trained includes at least a convolutional neural network and a multi-layer perceptron structure. As described in the Embodiment I, the convolutional neural network can be configured to extract feature information of video data and/or music data; and the multi-layer perceptron structure can be configured to perform vector-dimensional mapping on the feature information according to a preset label type to obtain the label vector of the video data and/or the music data.

Subsequently, after completing the building of the deep learning algorithm model, the deep learning algorithm model to be trained may be trained according to labeled video data and/or labeled music data to obtain a trained deep learning algorithm model, where the labeled video data and/or the labeled music data are obtained by manual labeling, that is, according to the preset label dimension and feature dimension, manually scoring is performed to obtain corresponding labeling information, and by using the labeled data, the training of the built deep learning algorithm model can be realized, so that the trained deep learning algorithm model can learn the thinking of manually labeling and process the video data to be processed to obtain the corresponding label vector.

In addition, it should be noted that the trained deep learning algorithm model obtained in the present implementation is used for processing the video data to be processed in the Embodiment I, and the processing process is similar to that in the Embodiment I, and details are not described herein.

In the video data processing method provided by the Embodiment II of the present disclosure, a deep learning algorithm model to be trained is built; the deep learning algorithm model to be trained is trained according to labeled video data and/or labeled music data to obtain a trained deep learning algorithm model, where the trained deep learning algorithm model is used to process input video data to be processed to obtain a label vector of the video data; the label vector of the video data and the label vector of each music data in the music library are processed by using a preset recommendation algorithm, to determine a recommendation score of the label vector of each music data with respect to the label vector of the video data; and the music data matching the video data is taken as background music according to the each recommendation score. By means of the above, the data processing efficiency of finding the background music of the video data in the music library is effectively improved, and the labor cost is reduced.

Figure 4:
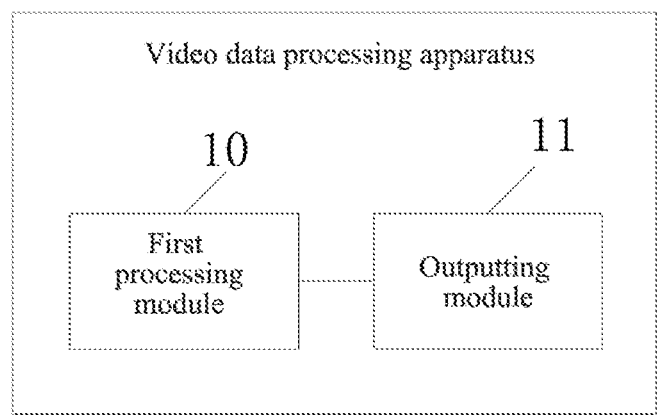
FIG. 4 is a schematic structural diagram of a video data processing apparatus according to Embodiment III of the present disclosure.

FIG. 4 is a schematic structural diagram of a video data processing apparatus according to Embodiment III of the present disclosure. As shown in FIG. 4, the video data processing apparatus includes:

a first processing module 10, configured to process, according to a preset trained deep learning algorithm model, input video data to be processed to obtain a label vector of the video data; where the label vector includes a confidence score of the video data under each label; and the first processing module is further configured to determine, according to a label vector of each music data in a music library and a preset recommendation algorithm, a recommendation score of the label vector of each music data with respect to the label vector of the video data;

an outputting module 11, configured to output, according to each recommendation score, music data matching the video data.

Optionally, the trained deep learning algorithm model includes at least: a convolutional neural network and a multi-layer perceptron; and the first processing module 10 is specifically configured to input the video data to be processed into the convolutional neural network to extract and obtain feature information of the video data, and input the feature information of the video data into the multi-layer perceptron to enable the multi-layer perceptron to perform vector-dimensional mapping on the feature information according to a preset label type to obtain the label vector of the video data.

Optionally, before processing input video data to be processed according to a preset trained deep learning algorithm model, the first processing module 10 is further configured to: collect music data, and process the collected music data by using the trained deep learning algorithm model to obtain the label vector of the music data; and store the music data and corresponding label vector in the music library.

Optionally, the first processing module 10 is specifically configured to obtain, according to the label vector of the video data and the label vector of each music data in the music library, a similarity between the label vector of the video data and the label vector of each music data based on the latent factor algorithm; and determine, according to each similarity, a recommendation score of each music data with respect to the video data.

Optionally, the outputting module 11 is specifically configured to: sort the each music data in accordance with the each recommendation score and output a preset number of music data whose recommendation score is greater than a preset threshold as the music data matching the video data.

For the video data processing apparatus provided by the Embodiment III of the present disclosure, the technical means is adopted which includes processing, according to a preset trained deep learning algorithm model, input video data to be processed to obtain a label vector of the video data, where the label vector includes a confidence score of the video data under each label; determining, according to a label vector of each music data in a music library and a preset recommendation algorithm, a recommendation score of the label vector of each music data with respect to the label vector of the video data; taking, according to the each recommendation score, the music data matching the video data as background music. By means of the above, and further the deep learning algorithm model and the recommendation algorithm, the music data matching the video data can be quickly determined, thus the data processing efficiency of finding the background music of the video data in the music library is effectively improved, and the labor cost is reduced.

Figure 5:
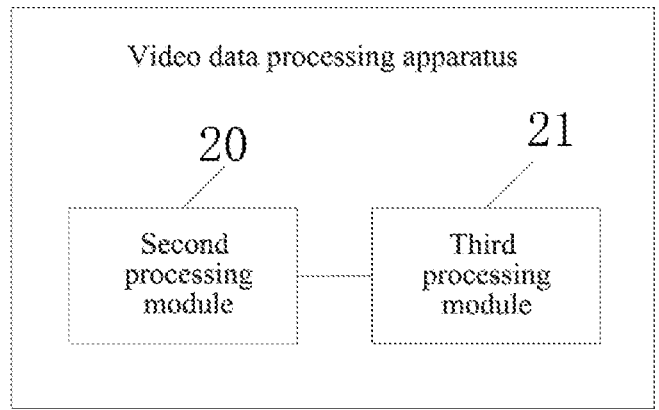
FIG. 5 is a schematic structural diagram of a video data processing apparatus according to Embodiment IV of the present disclosure.

FIG. 5 is a schematic structural diagram of a video data processing apparatus according to Embodiment IV of the present disclosure. As shown in FIG. 5, the video data processing apparatus includes:

a second processing module 20, configured to build a deep learning algorithm model to be trained;

a third processing module 21, configured to train the deep learning algorithm model to be trained to labeled video data and/or labeled music data to obtain a trained deep learning algorithm model; where the trained deep learning algorithm model is used for the any of the foregoing video data processing methods.

It should be noted that the video data processing apparatus provided by the present embodiment may be the same apparatus as the video data processing apparatus in the Embodiment III, or may be a different apparatus from the video data processing apparatus in the Embodiment III.

For the video data processing apparatus provided by the Embodiment IV of the present disclosure, the technical means is adopted which includes processing, according to a preset trained deep learning algorithm model, input video data to be processed to obtain a label vector of the video data; where the label vector includes a confidence score of the video data under each label; determining, according to a label vector of each music data in a music library and a preset recommendation algorithm, a recommendation score of the label vector of each music data with respect to the label vector of the video data; taking, according to the each recommendation score, the music data matching the video data as background music. By means of the above, and further a deep learning algorithm model and a recommendation algorithm, the music data matching the video data can be quickly determined, thus the data processing efficiency of finding the background music of the video data in the music library is effectively improved, and the labor cost is reduced.

Figure 6:
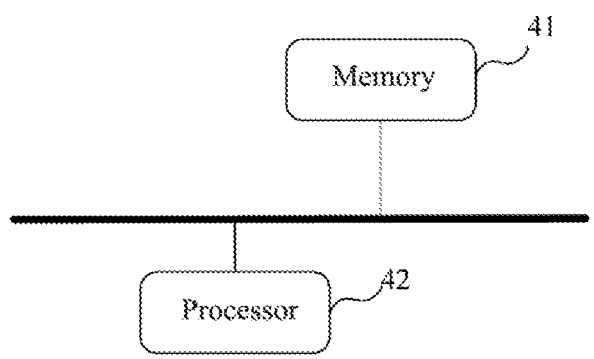
FIG. 6 is a schematic diagram of hardware of a video data processing apparatus according to Embodiment V of the present disclosure.

FIG. 6 is a schematic diagram of hardware of a video data processing apparatus according to Embodiment V of the present disclosure. As shown in FIG. 6, the video data processing apparatus includes: a memory 41, a processor 42, and a computer program stored in the memory 41 and executable on the processor 42, and the processor 42, when running the computer program, performs the methods of the above embodiments.

The present disclosure further provides a readable storage medium, including a program, which, when executed on a terminal, causes the terminal to perform the method of any of the above embodiments.

Those skilled in the art will understand that all or part of the steps to implement the various method embodiments described above may be accomplished by hardware related to program instructions. The aforementioned program may be stored in a computer readable storage medium. The program, when executed, performs the steps including the foregoing method embodiments; and the foregoing storage medium includes various media that can store program codes, such as an ROM, an RAM, a magnetic disk, or an optical disk.

Finally, it should be noted that the above embodiments are merely used to illustrate rather than limit the technical solutions of the present disclosure. Although the present disclosure has been described in detail with reference to the foregoing embodiments, those skilled in the art should understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present disclosure.

What is claimed is:

1. A video data processing method, comprising:
processing, according to a preset trained deep learning algorithm model, input video data to be processed to obtain a label vector of the video data, wherein the label vector comprises a confidence score of the video data under each label;
determining, according to a label vector of each music data in a music library and a preset recommendation algorithm, a recommendation score of the label vector of the each music data with respect to the label vector of the video data; and
outputting, according to each recommendation score, music data matching the video data,
wherein the trained deep learning algorithm model comprises at least: a convolutional neural network and a multi-layer perceptron;
and the processing, according to a preset trained deep learning algorithm model, input video data to be processed to obtain a label vector of the video data comprises:
inputting the video data to be processed into the convolutional neural network to extract and obtain feature information of the video data; and
inputting the feature information of the video data into the multi-layer perceptron to enable the multi-layer perceptron to perform vector-dimensional mapping on the feature information according to a preset label type to obtain the label vector of the video data.

2. The video data processing method according to claim 1, wherein before the processing, according to a preset trained deep learning algorithm model, input video data to be processed, the method further comprises:
- collecting music data and processing collected music data by using the trained deep learning algorithm model to obtain the label vector of the music data; and
- storing the music data and corresponding label vector in the music library.

3. The video data processing method according to claim 1, wherein the determining, according to a label vector of each music data in a music library and a preset recommendation algorithm, a recommendation score of the label vector of the each music data with respect to the label vector of the video data comprises:
- obtaining, according to the label vector of the video data and the label vector of the each music data in the music library, a similarity between the label vector of the video data and the label vector of the each music data based on the recommendation algorithm; and
- determining, according to each similarity, the recommendation score of the each music data with respect to the video data.

4. A video data processing method, comprising:
- processing, according to a preset trained deep learning algorithm model, input video data to be processed to obtain a label vector of the video data, wherein the label vector comprises a confidence score of the video data under each label;
- determining, according to a label vector of each music data in a music library and a preset recommendation algorithm, a recommendation score of the label vector of the each music data with respect to the label vector of the video data; and
- outputting, according to each recommendation score, music data matching the video data,
- wherein the outputting, according to each recommendation score, music data matching the video data comprises:
- sorting the each music data in accordance with the each recommendation score and outputting a preset number of music data whose recommendation score is greater than a preset threshold as the music data matching the video data.

5. The video data processing method according to claim 4, wherein the trained deep learning algorithm model comprises at least: a convolutional neural network and a multi-layer perceptron;
- and the processing, according to a preset trained deep learning algorithm model, input video data to be processed to obtain a label vector of the video data comprises:
- inputting the video data to be processed into the convolutional neural network to extract and obtain feature information of the video data; and
- inputting the feature information of the video data into the multi-layer perceptron to enable the multi-layer perceptron to perform vector-dimensional mapping on the feature information according to a preset label type to obtain the label vector of the video data.

6. The video data processing method according to claim 4, wherein before the processing, according to a preset trained deep learning algorithm model, input video data to be processed, the method further comprises:
- collecting music data and processing collected music data by using the trained deep learning algorithm model to obtain the label vector of the music data; and
- storing the music data and corresponding label vector in the music library.

7. The video data processing method according to claim 4, wherein the determining, according to a label vector of each music data in a music library and a preset recommendation algorithm, a recommendation score of the label vector of the each music data with respect to the label vector of the video data comprises:
- obtaining, according to the label vector of the video data and the label vector of the each music data in the music library, a similarity between the label vector of the video data and the label vector of the each music data based on the recommendation algorithm; and
- determining, according to each similarity, the recommendation score of the each music data with respect to the video data.

8. A video data processing method, comprising:
- building a deep learning algorithm model to be trained; and
- training the deep learning algorithm model to be trained according to labeled video data and/or labeled music data to obtain the trained deep learning algorithm model;
- wherein the trained deep learning algorithm model is used for the video data processing method of claim 1.

9. A video data processing apparatus, comprising:
- a memory, a processor connected to the memory, and a computer program stored in the memory and executable on the processor,
- wherein the computer program, when executed by the processor, causes the processor to:
- process, according to a preset trained deep learning algorithm model, input video data to be processed to obtain a label vector of the video data, wherein the label vector comprises a confidence score of the video data under each label;
- determine, according to a label vector of each music data in a music library and a preset recommendation algorithm, a recommendation score of the label vector of the each music data with respect to the label vector of the video data; and
- output, according to each recommendation score, music data matching the video data,
- wherein the trained deep learning algorithm model comprises at least: a convolutional neural network and a multi-layer perceptron;
- wherein the computer program, when executed by the processor, causes the processor to:
- input the video data to be processed into the convolutional neural network to extract and obtain feature information of the video data; and
- input the feature information of the video data into the multi-layer perceptron to enable the multi-layer perceptron to perform vector-dimensional mapping on the feature information according to a preset label type to obtain the label vector of the video data.

10. The video data processing apparatus according to claim 9, wherein the computer program, when executed by the processor, causes the processor to:
- collect music data and process collected music data by using the trained deep learning algorithm model to obtain the label vector of the music data; and
- store the music data and corresponding label vector in the music library.

11. The video data processing apparatus according to claim 9, wherein the computer program, when executed by the processor, causes the processor to:

obtain, according to the label vector of the video data and the label vector of the each music data in the music library, a similarity between the label vector of the video data and the label vector of the each music data based on the recommendation algorithm; and determine, according to each similarity, the recommendation score of the each music data with respect to the video data.

12. The video data processing apparatus according to claim 9, wherein the computer program, when executed by the processor, causes the processor to:

sort the each music data in accordance with the each recommendation score and output a preset number of music data whose recommendation score is greater than a preset threshold as the music data matching the video data.

13. A video data processing apparatus, comprising:

a memory, a processor connected to the memory, and a computer program stored in the memory and executable on the processor, wherein the computer program, when executed by the processor, causes the processor to:

build a deep learning algorithm model to be trained; and train the deep learning algorithm model to be trained according to labeled video data and/or labeled music data to obtain the trained deep learning algorithm model;

wherein the trained deep learning algorithm model is used for the video data processing method of claim 1.

14. A non-transitory readable storage medium, comprising a program, which, when executed on a terminal, causes the terminal to perform the method of claim 1.

15. A video data processing method, comprising:

building a deep learning algorithm model to be trained; and training the deep learning algorithm model to be trained according to labeled video data and/or labeled music data to obtain the trained deep learning algorithm model;

wherein the trained deep learning algorithm model is used for the video data processing method of claim 4.

16. A video data processing apparatus, comprising:

a memory, a processor connected to the memory, and a computer program stored in the memory and executable on the processor, wherein the computer program, when executed by the processor, causes the processor to perform the video data processing method of claim 4.

17. A video data processing apparatus, comprising:

a memory, a processor connected to the memory, and a computer program stored in the memory and executable on the processor, wherein the computer program, when executed by the processor, causes the processor to:

build a deep learning algorithm model to be trained; and train the deep learning algorithm model to be trained according to labeled video data and/or labeled music data to obtain the trained deep learning algorithm model;

wherein the trained deep learning algorithm model is used for the video data processing method of claim 4.

18. A non-transitory readable storage medium, comprising a program, which, when executed on a terminal, causes the terminal to perform the method of claim 4.

* * * * *